(12) United States Patent
Busjaeger et al.

(10) Patent No.: US 10,832,309 B2
(45) Date of Patent: Nov. 10, 2020

(54) INVENTORY DATA MODEL FOR LARGE SCALE FLASH SALES

(71) Applicant: salesforce.com, inc., San Francisco, CA (US)

(72) Inventors: Benjamin Busjaeger, San Carlos, CA (US); Michael Sgroi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 402 days.

(21) Appl. No.: 15/956,049

(22) Filed: Apr. 18, 2018

(65) Prior Publication Data

US 2019/0220917 A1     Jul. 18, 2019

Related U.S. Application Data

(60) Provisional application No. 62/617,096, filed on Jan. 12, 2018.

(51) Int. Cl.
```
G06Q 30/06      (2012.01)
G06Q 10/08      (2012.01)
G06F 16/23      (2019.01)
G06F 16/28      (2019.01)
```
(52) U.S. Cl.
CPC ......... *G06Q 30/0633* (2013.01); *G06F 16/23* (2019.01); *G06F 16/288* (2019.01); *G06Q 10/087* (2013.01)

(58) Field of Classification Search
CPC ............................ G06Q 30/00; G06Q 30/02
USPC ....................................................... 707/610
See application file for complete search history.

(56) References Cited

U.S. PATENT DOCUMENTS 7,730,478 B2    6/2010  Weissman
2010/0169336 A1*  7/2010  Eckhoff-Hornback ..................... G06Q 20/203
                                                                                707/758

* cited by examiner

*Primary Examiner* — Apu M Mofiz
*Assistant Examiner* — Farhad Agharahimi
(74) *Attorney, Agent, or Firm* — Nicholson De Vos Webster & Elliott LLP

(57) ABSTRACT

A method is implemented by a computing device to identify available ones of a plurality of items of an inventory, where each of the plurality of items has a hold status identifying the item as being currently available or already on hold. The method includes selecting available ones of the plurality of items based on a first bitset and a plurality of second bitsets and asynchronously updating the first bitset and the plurality of second bitsets to reflect a synchronously updated version of the hold status of the plurality of items resulting from one or more of the plurality of items being successfully placed on hold and/or released from being placed on hold.

20 Claims, 9 Drawing Sheets

INVENTORY DATA MODEL FOR LARGE SCALE FLASH SALES

CROSS-REFERENCE TO RELATED APPLICATIONS

This application claims the benefit of U.S. Provisional Application No. 62/617,096, filed Jan. 12, 2018, which is hereby incorporated by reference.

TECHNICAL FIELD

One or more implementations relate to allocating resources to requestors while reducing/minimizing contention.

BACKGROUND ART

Flash sales are short-lived e-commerce events (e.g., that last for minutes or hours) during which an online store offers a limited quantity of a special or discounted product. The limited time and availability often attracts large interest and entices customers to quickly purchase the product on the spot. Being able to quickly distribute available inventory to a large audience is critical to the success of this business model. For example, popular mobile phone pre-order sales sell several million units within just a few minutes. Handling and processing such high volume of requests and transactions can be challenging for e-commerce systems.

Consider a flash sale that has an inventory of one million items to sell. During the flash sale, users may make a request to place a hold on one of the items (e.g., by adding the product to their online shopping cart). When the user makes a request to place a hold, the e-commerce system has to find an item from the inventory that is available (e.g., an item that has not already been sold and is not being held by another user). Using cross-table transactions with a global counter, as is commonly done with relational databases, does not scale as it introduces bottleneck and contention.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for allocating items to requestors that can be scaled with reduced bottlenecking and contention. For purposes of illustration only, various implementations are described herein in the context of a flash sale where the items are product items to be sold and the requestors are users (e.g., customers). However, it should be understood that the concepts described herein can be applied to other contexts where there is a need to allocate a limited number of items/resources to a number of requestors in a short period of time while reducing/minimizing bottleneck and contention. For example, in an implementation, the items may be computing/networking resources and the requestors may be computing/networking devices.

According to some implementations, an inventory has a plurality of items that can be placed on hold by one or more requestors. Each item has a corresponding hold that can be obtained for that item to reserve that item. The holds are divided into a plurality of fixed-sized groups. Since each item has a corresponding hold that can be obtained for that item, the items are indirectly divided into the same plurality of groups. Each group is associated with a bitset (also referred to herein as a group bitset) that indicates which holds in that group are available to be obtained. There is also a bitset (also referred to herein as an inventory bitset) that indicates which of the plurality of groups has at least one hold available to be obtained. A hold is selected by selecting a group that the inventory bitset indicates as having at least one hold available to be obtained, and then selecting a hold from the selected group that the group bitset associated with the selected group indicates as being available. An attempt is then made to obtain the selected hold. If the selected hold cannot be obtained (e.g., due to a concurrent request obtaining the selected hold), the process is repeated to select another hold. According to some implementations, the inventory bitset and the group bitsets are asynchronously updated to reflect updates to the holds. Implementations may provide an immediate response (e.g., with single-digit or tens of milliseconds latency) of whether a hold could be obtained for an item in the face of several thousands of concurrent requestors requesting to place a hold on an item. For example, it has been shown that implementations can handle up to 40,000 requests per second for an inventory of 10 million items. Various implementations are further described herein below.

Figure 1:
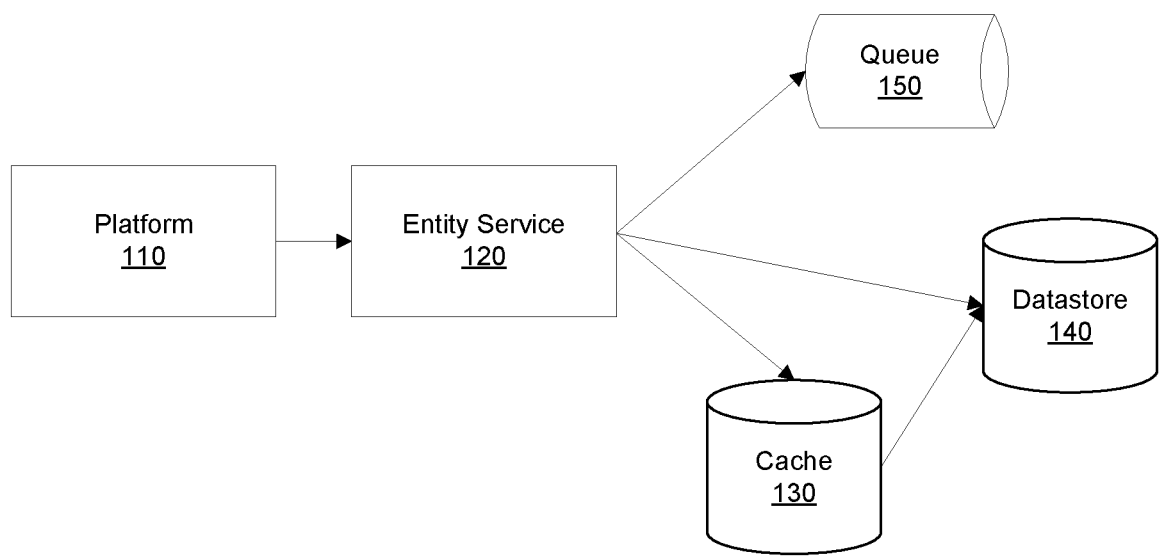
FIG. 1 is a block diagram of a system in which items for a flash sale can be allocated to requestors with reduced bottlenecking and contention, according to some implementations.

FIG. 1 is a block diagram of a system in which items for a flash sale can be allocated to requestors with reduced bottlenecking and contention, according to some implementations. As shown in the diagram, the system includes a platform 110, an entity service 120, a cache 130, a datastore 140, and a queue 150. The platform 110 allows vendors to develop and host web and mobile applications in the cloud. In an implementation, the application is an e-commerce application. The platform 110 allows defining entity objects that represent real-world objects of the vendor's business model. For example, for an e-commerce application, the entity objects could include a cart (i.e., online shopping cart), inventory, and order, which are backed by external data sources. Also, the platform 110 may provide Data Manipulation Language (DML) operations (e.g., insert, update, and delete) and query expressions (e.g., Salesforce Object Query Language (SOQL)) to manipulate and retrieve entity objects in response to web requests. The entity service 120 (e.g., OCD) implements the entity object operations (Data Definition Language (DDL) and DML) through an underlying persistent datastore 140 (e.g., Amazon DynamoDB), cache 130 (e.g., Amazon DynamoDB Accelerator (DAX)), and a persistent queuing service 150 (e.g., Simple Queueing Service (SQS)). In an implementation, the entity service 120 includes a set of stream processors that listen for changes in the datastore 140 to perform asynchronous processing. In an implementation, each of the components can be scaled independently. In a production deployment with a high load, there will typically be many instances of the platform 110, entity service 120, and cache 130 running concurrently. Also, in some implementations, the persistent datastore 140 and the queue 150 may run many partitions to support high throughput. In an implementation, the datastore 140 is a database (e.g., a relational database).

Entity Interfaces

A flash sale can be implemented using a data template (which may be referred to as an "AllocationMap" data template) that exposes a more abstract and restricted view on a set of underlying entities. The following code snippets define exemplary entities (inventory entity (also referred to as an allocation entity) and hold entity) of a flash sale and the operations that are exposed on them.

Inventory (or Allocation)
   id: String
   allocated: Number
   available: Number (read-only)
Operations:
   insert
   input: id, allocated
   output: Inventory
   errors: already_exists
   query
   input: id
   output: Inventory
   error: not_found An inventory represents a plurality of items that can be allocated to requestors. As shown above, in an implementation, an inventory record includes fields for product ID (id), the number of items that are allocated (allocated), and the current number of items that are available (available). In an implementation, the inventory records are immutable, so they can only be inserted. To set up a new flash sale, a new inventory record is inserted that includes the product ID of the product to be sold and the quantity to allocate for the flash sale. If an inventory record for the product ID already exists, an error (already_exists) is returned, otherwise the newly created inventory record is returned. Initially, the available quantity is the same as the allocated amount. Inventory records can be queried by product ID to obtain the current available inventory level during or after the flash sale. If no inventory records for the given product ID exists, then an error (not_found) is returned.

Hold
   inventory_id: String
   id: String (read-only)
   user_id: String
Operations:
   insert
   input: inventory_id, user_id
   output: Hold
   error: no_inventory_available
   query
   input: user_id
   output: List<Hold>
   delete
   input: inventory_id, id
   error: not_found As shown above, in an implementation, a hold record includes fields for inventory ID (inventory_id), hold ID (id), and user ID (user_id). A hold record is inserted to indicate that a given user wishes to obtain a hold on an inventory item (e.g., when the user adds the product to their online shopping cart). If a hold on an inventory item is successfully obtained, the hold record is returned. Otherwise, an error (no_inventory_available) is returned indicating that no inventory is available. Hold records can be queried by user ID (e.g., this may be used to render a user's online shopping cart). Also, hold records can be deleted (e.g., if an item is released due to the user not purchasing the item within an allotted period of time).

Figure 2:
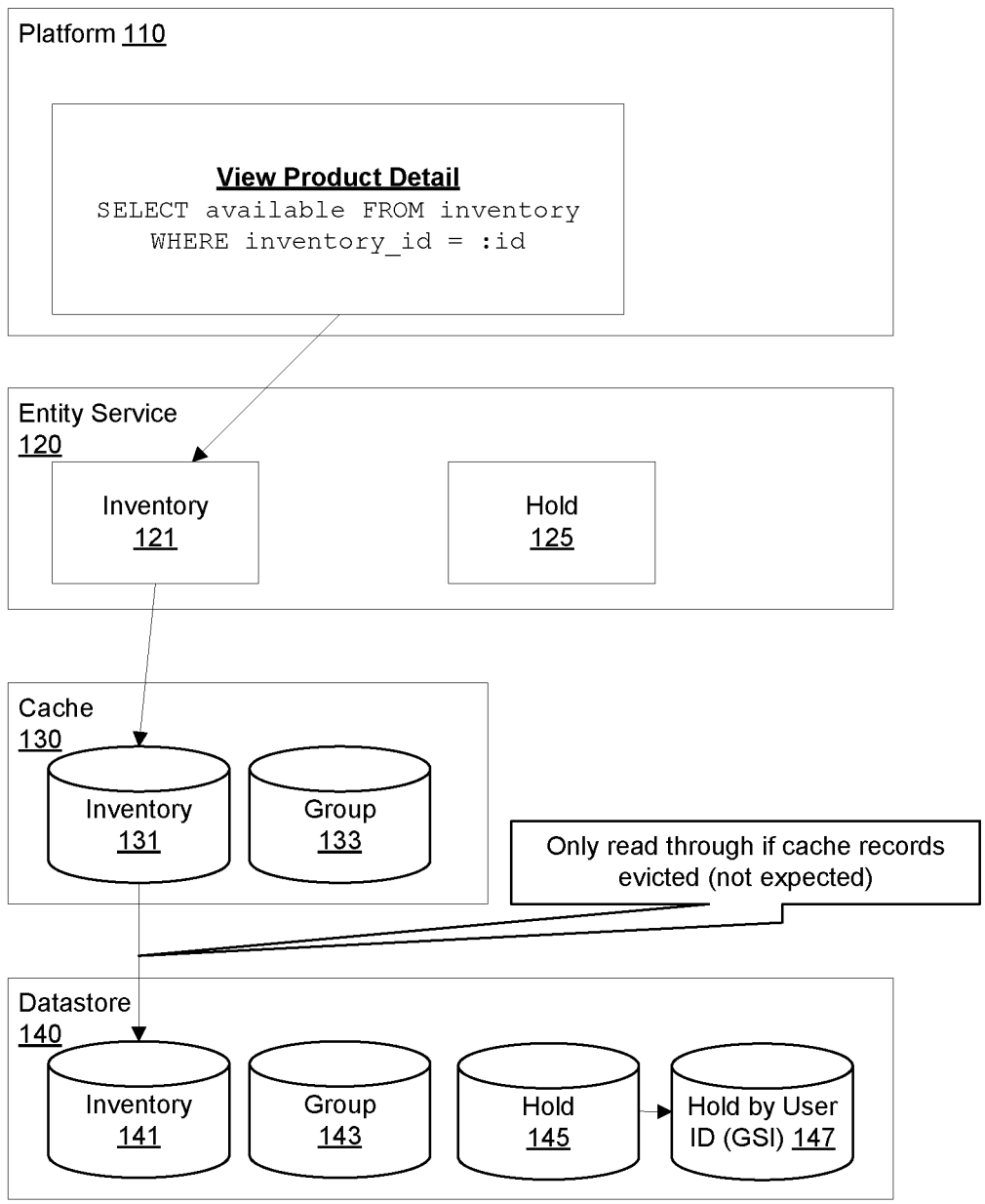
FIG. 2 is a diagram illustrating querying an inventory record, according to some implementations.

The implementation details of the operations mentioned above are described in additional detail herein below. In an implementation, the datastore 140 is a relational database and it stores inventory records and hold records. In this implementation, inventory records may be stored in an inventory table of the database and hold records may be stored in a hold table of the database. For example, as shown in FIG. 2, inventory records may be stored in inventory table 141 and hold records may be stored in hold table 145. In an implementation, each of the plurality of fixed-sized groups is represented as a group record in a group table 143 of the database. In an implementation, the inventory table 131 and the group table 133 (or a subset thereof) are cached (stored in cache 130). This may provide the advantage of reducing read latency and increasing throughput. For purposes of illustration only, various implementations are described herein in the context where the datastore 140 is implemented as a relational database. However, it should be understood that the concepts described herein can be implemented using different types of datastores.

Operations

Inventory.Insert (e.g., for allocating inventory)

Inventory for a product is allocated prior to the flash sale by inserting an inventory record for that product into an inventory table of the datastore 140. At the platform level, this may be a simple insert statement. The entity service 120 translates this into a write into the inventory table of the datastore 140. The write goes through the cache 130 so that the record is cached from that point on.

Inventory.Query (e.g., for Rendering a Product Detail Page)

FIG. 2 is a diagram illustrating querying an inventory record, according to some implementations. As shown in the diagram, to render a product detail page that indicates the current inventory level (e.g., the number of items available in inventory or whether the product is available/unavailable), the platform 110 queries the inventory entity 121. The entity service 120 translates this into a lookup in the inventory table 131, 141. Since the lookup goes through the cache 130, all inventory reads will be satisfied from the cache 130, unless the inventory record has been evicted from the cache 130 (which is an unexpected event).

Hold.Insert (e.g., for Adding an Item to an Online Shopping Cart)

Figure 3:
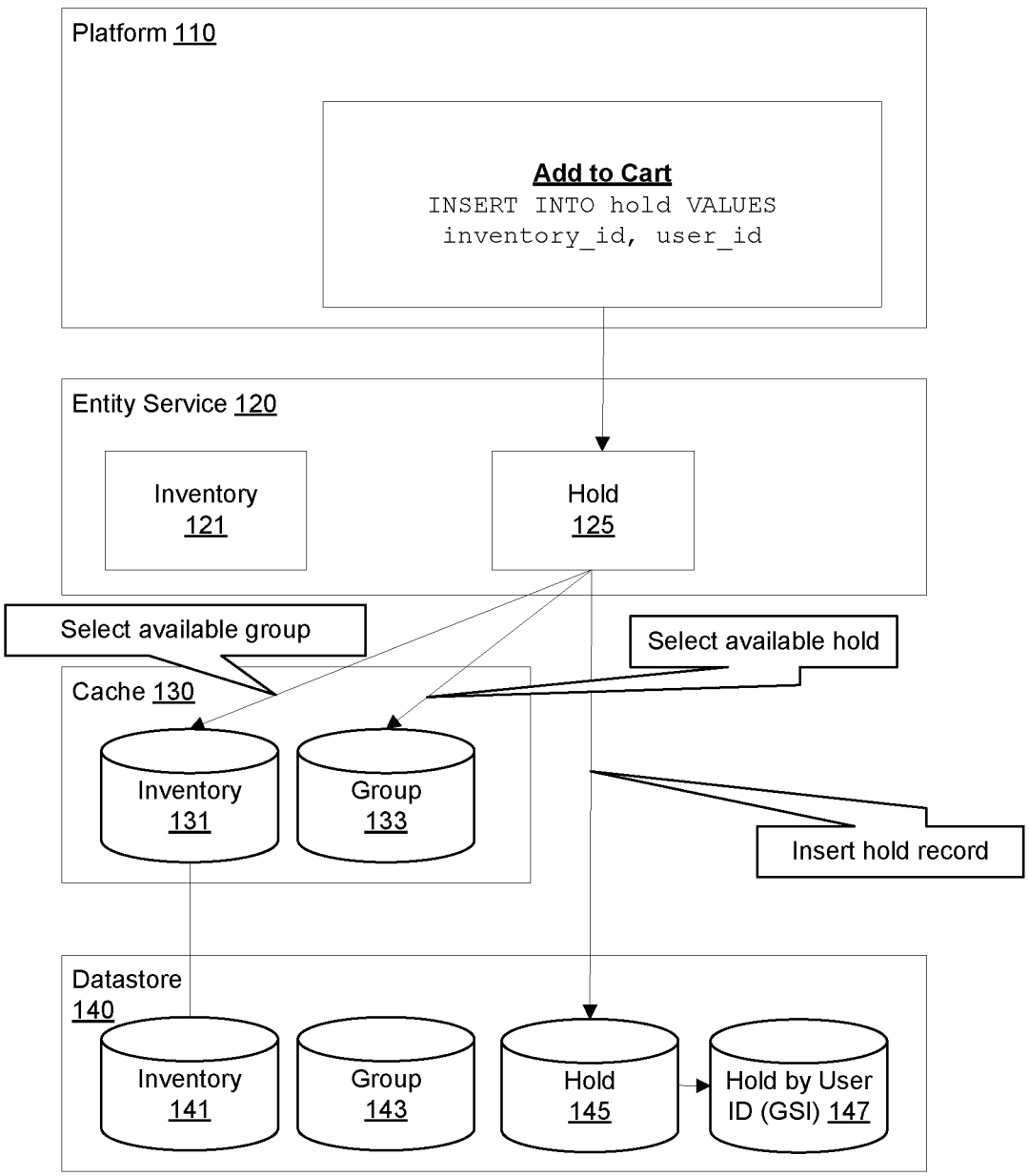
FIG. 3 is a diagram illustrating inserting a hold record, according to some implementations.

FIG. 3 is a diagram illustrating inserting a hold record, according to some implementations. As shown in the diagram, to add an item to the user's online shopping cart and thereby exclusively reserve an item for a period of time (e.g., the next few minutes), the platform 110 issues an insert statement on the hold entity 125. It should be noted that the insert specifies the product ID (inventory_id) and user ID (user_id), but not the hold ID. As will be described in additional detail herein below, the hold ID is determined by the underlying implementation using two lookups and a conditional insert.

To minimize contention when multiple users are making requests, each request should independently place a hold on an available item with minimal coordination with other requests. One way to accomplish this is to randomly choose an inventory item and try to place a hold on it. If a hold has already been placed on the chosen item, then another item is randomly chosen. While this minimizes contention, it increases the number of retries, particularly towards the end of the flash sale when many of the items have already been reserved (placed on hold).

To alleviate this problem, in some implementations, two levels of indexes are maintained to track the hold status of the items. These indexes are updated asynchronously as items are placed on hold and released from being placed on hold. In an implementation, these indexes can also be used to compute the available inventory in an eventually consistent manner.

Indexes:

To be able to handle large inventories for a given product, holds can be split into fixed-sized groups. For example, for a product with 10 million allocated items, there can be 1,000 groups of size 10,000. In this example, holds 0-9,999 can be in group 0, holds 1,000-19,999 can be in group 1, and so on). While the example given above has a group size of 10,000, it should be understood that the group size can be configured as needed depending on the scale of the flash sale and/or other factors. Each group can be represented as a group record in a group table 143 of the datastore (and cached in group table 133 of the cache 130). A group record for a group may store a bitset (group bitset) that indicates whether a given hold in that group is claimed or not. For example, if the second hold in a group is claimed, then the bitset for that group at index 2 has a value of 1, otherwise it has a value of 0. In an implementation, groups are organized so that holds in the same group are co-located (e.g., in the same group record) by using a composite key (e.g., hash key) made of the inventory ID and the group ID. Also, each inventory record may store a bitset (inventory bitset) that indicates whether all of the holds in a given group have been obtained or not. For example, if all of the holds in the second group have been obtained, then the bitset at index 2 has a value of 1, otherwise it has a value of 0.

An exemplary algorithm for inserting a hold record is provided below.

```
while (true) {
  Inventory inventory = inventories.query(hold.inventoryId);
  int groupId = sample(inventory.groups); // randomly select a group
  if (groupId == -1)
    break; // inventory full -> tell user
  String inventory_group_id = hold.inventoryId + '.' + groupId;
  Group group = groups.queryById(inventory_group_id);
  int holdId = sample(group.holds); // randomly select a hold from the
  selected group
  if (holdId == -1)
    continue; // group full -> try another group
  Hold candidate = new Hold(inventory_group_id, holdId, hold.userId);
  if (tryInsert(candidate)) { // attempt to insert hold record
    return Optional.of(candidate);
  } // else: hold was claimed by concurrent request, retry
}
```

The algorithm randomly selects a group that the inventory bitset indicates as having at least one hold available to be obtained (there is at least one hold available to be obtained in the group). The algorithm then randomly selects a hold that the group bitset of the selected group indicates as being available to be obtained. The algorithm then attempts to obtain the hold by attempting to insert a hold record into the hold table 145. It should be noted that the attempt might be unsuccessful (e.g., if the hold record for the same hold already exists in the hold table 145 due to a concurrent request obtaining the hold), and in this case, the algorithm is repeated to select another hold.

Figure 4:
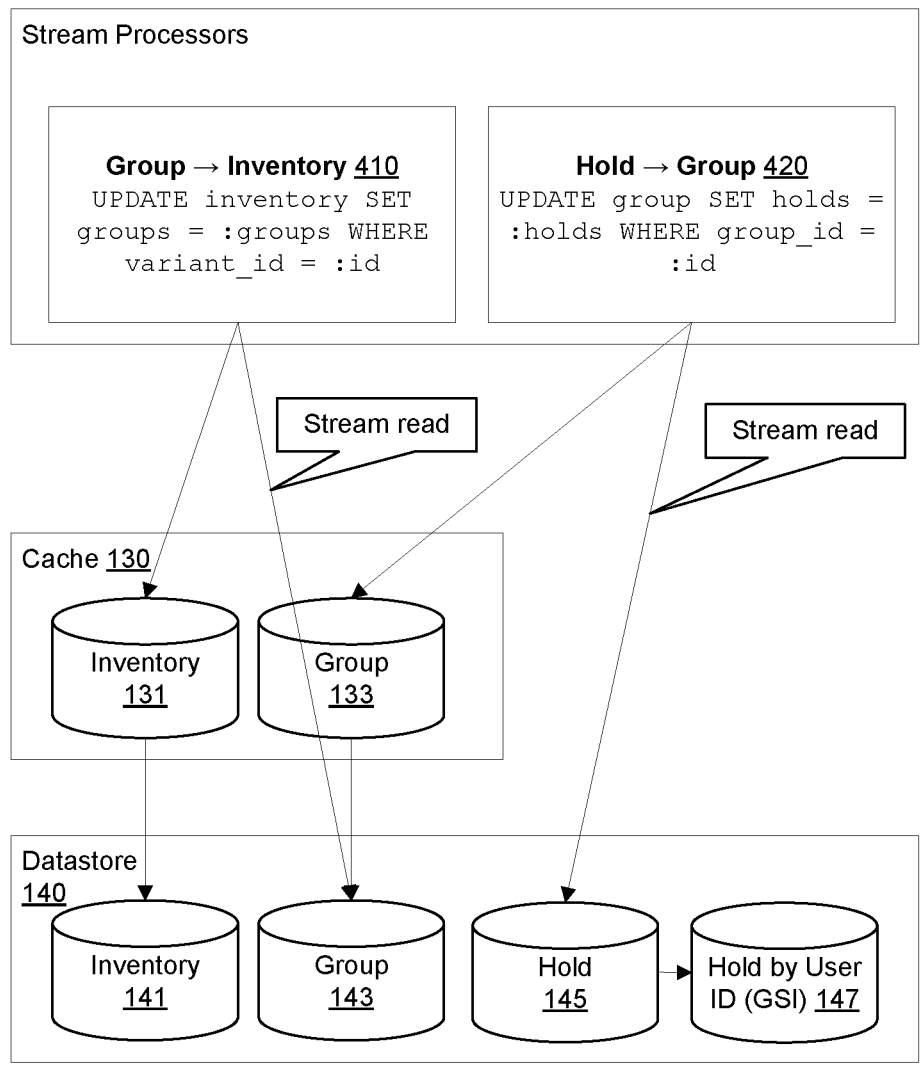
FIG. 4 is a diagram illustrating asynchronously updating bitsets, according to some implementations.

FIG. 4 is a diagram illustrating asynchronously updating bitsets, according to some implementations. A further aspect of placing a hold on an item is asynchronously updating the bitsets (the inventory bitset and the plurality of group bitsets) to reflect the hold statuses. Upon each successful insert or delete of a hold record, a change event record is emitted that is processed by a hold-to-group stream processor 420. Each change event record is assigned a sequence number that increases for each change event. The stream processor 420 takes a batch of change event records and updates the bitset for each impacted group to reflect the change events (e.g., sets the bits for holds that have been claimed to 1 and sets the bits for holds that have been released to 0). Thus, the hold records in the hold table 145 can be considered as a synchronously updated version of the hold statuses and the bitsets can be considered as an asynchronously updated version of the hold statuses, which are eventually consistent with the synchronously updated version (but may not be up to date based on when the asynchronous updates happen). In an implementation, since stream processor workers are typically associated with a single datastore partition, contention can be reduced on the group table 133, 143 by co-locating holds in the same group on a single partition. In an implementation, the bitset is updated in a manner that is able to handle stream processor retries (e.g., stream processors may receive the same change event more than once in case of system failures) and concurrent processing by other stream processors. As will be further described herein below, this can be handled by using the stream sequence number to make the stream processor 420 update idempotent.

An exemplary algorithm for updating a bitset is provided below.

```
void process(List<Record> records) {
  records.groupBy(id).forEach(groupId, records -> {
    // the following is verbal description of algorithm:
    1. read group
    2. filter out records with sequence number older than sequence
       number stored in group for shard (to guard against retries)
    3. update bitset: set 1 for all inserted records, 0 for all deleted records
    4. update stream state: set sequence number for current shard in
       group to sequence number of last record processed
    5. write group with condition: sequence number for current shard is
       the same as what step 1 returned (guards against concurrent
       stream processor)
  });
}
```

The algorithm takes a batch (e.g., list) of change event records that affect a particular group. At step 1, the algorithm reads the group record for the group, where the group record stores the most recently processed sequence number for that group. At step 2, the algorithm filters out change event records that have sequence numbers that are older than the most recent sequence number that has been processed for that group to guard against retries. At step 3, the algorithm updates the bitset for the group to reflect the change event records (e.g., set bit to 1 for holds that have been obtained and set bit to 0 for holds that have been released). At step 4, the algorithm updates the most recently processed sequence number for that group. At step 5, the algorithm writes the group record for the group only if the most recently processed sequence number for the group is the same as in step 1 to guard against concurrent stream processors.

For example, as shown in FIG. 4, the hold-to-group stream processor 420 reads the stream of change events for the hold table 145 (e.g., the change events may indicate whether a hold was obtained or released) and updates the bitsets in the group table 133, 143 to reflect the change events. In an implementation, the bitsets can be updated in a manner that is able to guard against retries and concurrent processing (e.g., as done in steps 2 and 5, respectively).

In an implementation, the changes to the group table 133, 143 are propagated to the inventory table 131, 141 using the same or similar algorithm described above. For example, as shown in FIG. 4, the group-to-inventory stream processor 410 reads the change events for the group table 133, 143 (e.g., to determine whether all holds in the group have been obtained or not) and updates the bitsets in the inventory table 131, 141 to reflect the change events. In some implementations, as shown in FIG. 4, the changes to the group table 133, 143 and/or inventory table 131, 141 are written through the cache 130. This improves performance by allowing bitsets to be read (from cache) without having to read the datastore 140.

Hold.Query (e.g., for Rendering a User's Online Shopping Cart)

Figure 5:
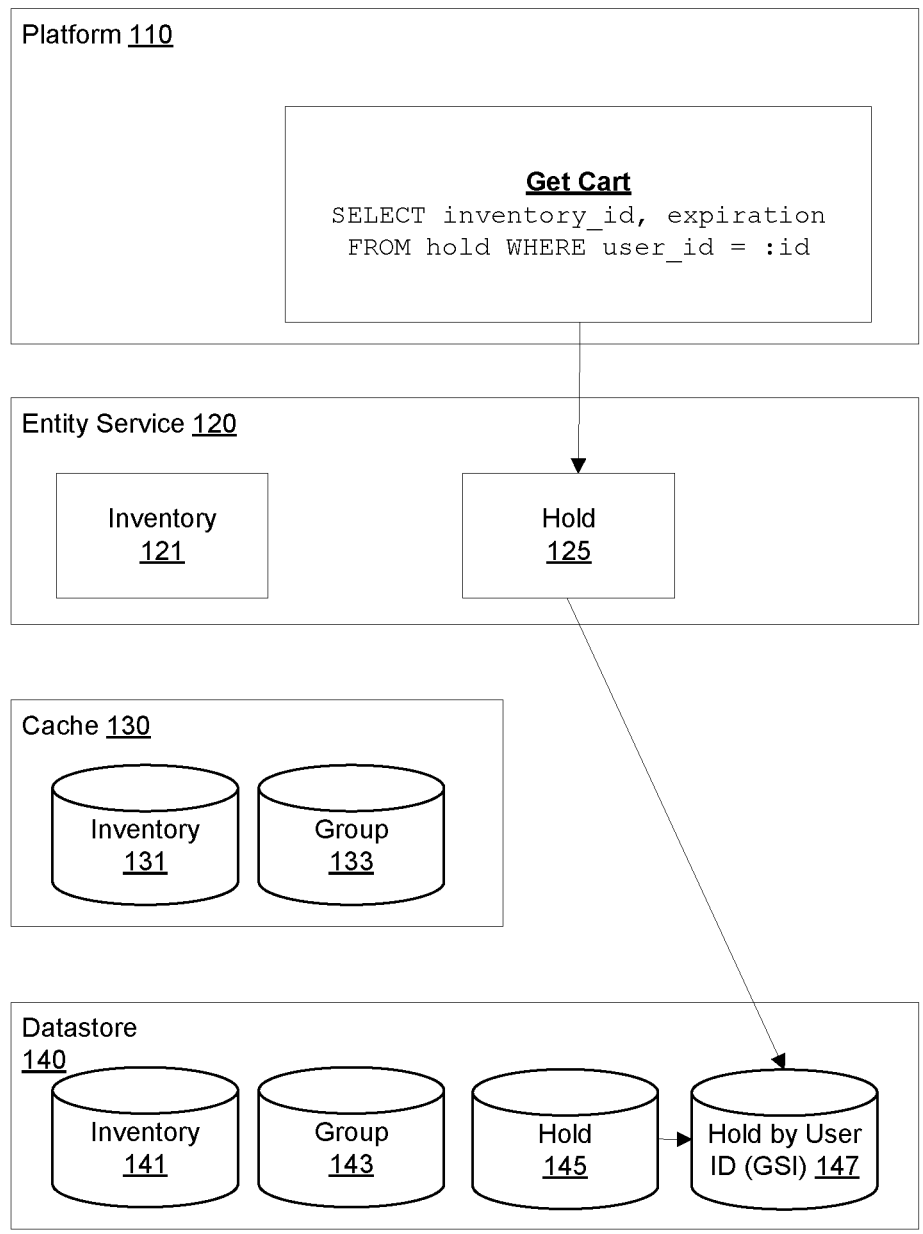
FIG. 5 is a diagram illustrating querying hold records, according to some implementations.

FIG. 5 is a diagram illustrating querying hold records, according to some implementations. Hold records may be queried, for example, to render a user's online shopping cart. For example, the platform 110 may query the hold entity 125, and the hold entity 125 translates this into a lookup in the hold table 145. In an implementation, to improve the speed of retrieving hold records by user ID, a secondary index (e.g., a Global Secondary Index (GSI)) can be created on the hold table 145. This can be seen as a second table 147 that is transparently and asynchronously updated with low latency with changes to the hold table 145, but indexed on user ID.

Hold.Delete (e.g., for Expiring/Removing Items in an Online Shopping Cart)

Figure 6:
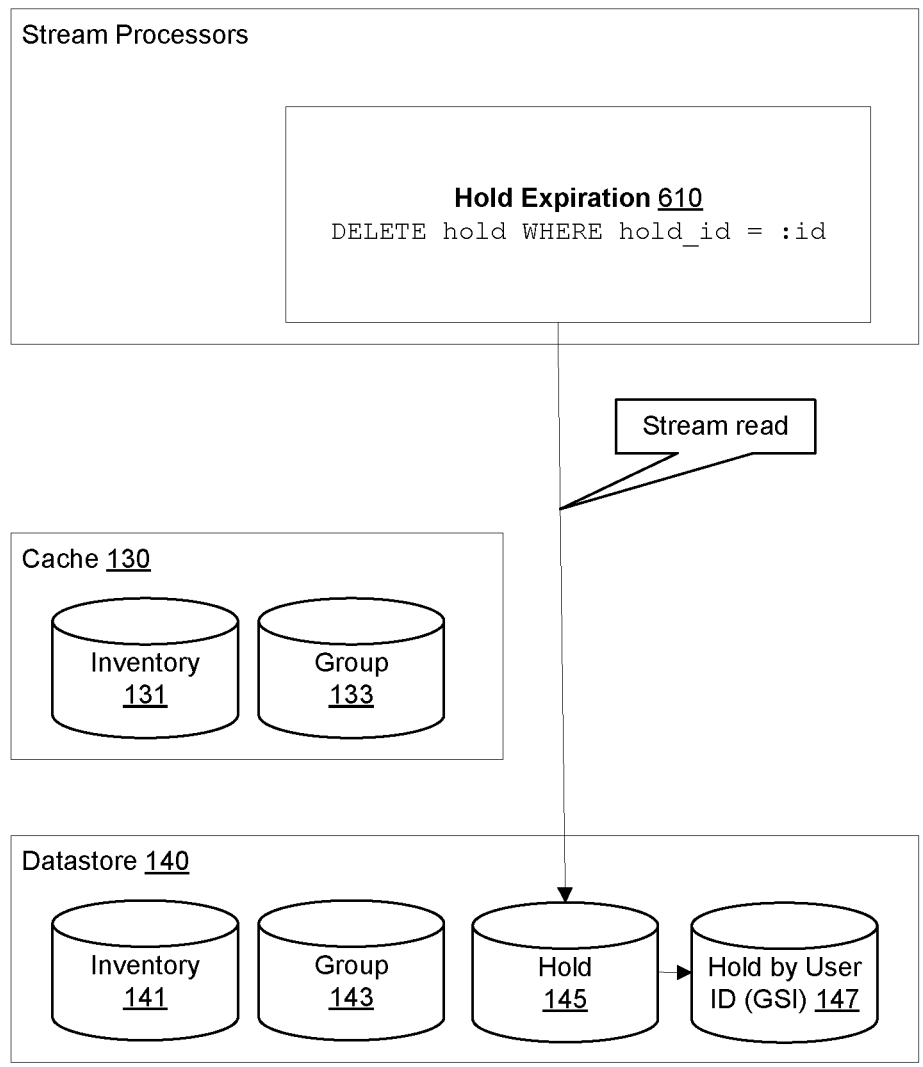
FIG. 6 is a diagram illustrating deleting a hold record, according to some implementations.

FIG. 6 is a diagram illustrating deleting a hold record, according to some implementations. Holds can be expired using a stream processor 610 that reads at some offset behind the head of the stream (e.g., 5 minutes behind) and attempts to delete holds that have not yet been ordered (e.g., hold record is deleted if it was inserted more than 5 minutes ago).

Place Order

Figure 7:
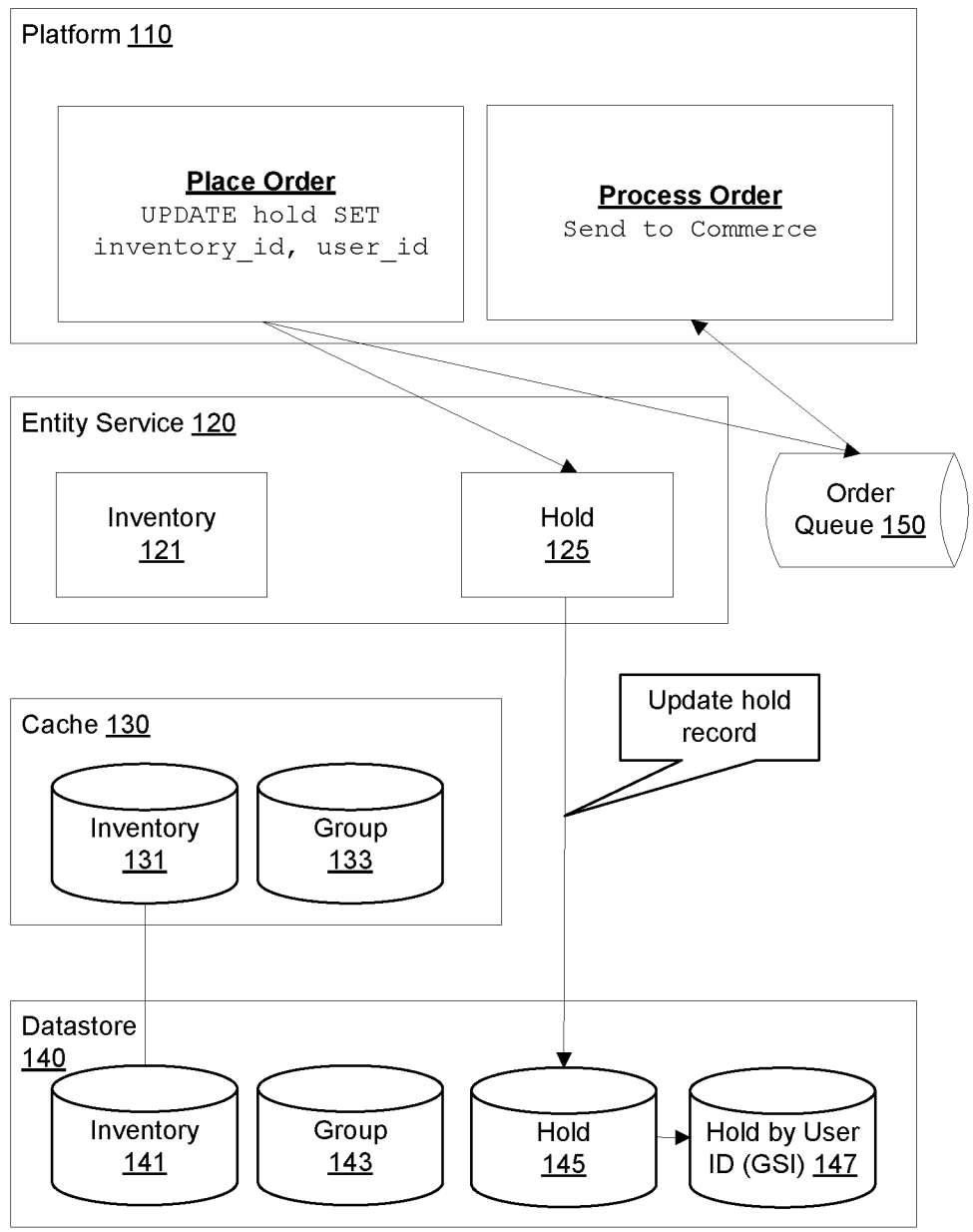
FIG. 7 is a diagram illustrating placing an order, according to some implementations.

FIG. 7 is a diagram illustrating placing an order, according to some implementations. As shown in the diagram, placing an order queues the order in an order queue 150 to be processed by external systems. In an implementation where holds can expire (e.g., when a user has not placed an order within 5 minutes), the order request also causes the expiration time for the hold record to be removed or increased (to prevent it from expiring).

Deallocate

An inventory can be deallocated by deleting the inventory record and configuring time-to-live (TTL) for the hold table.

Figure 8:
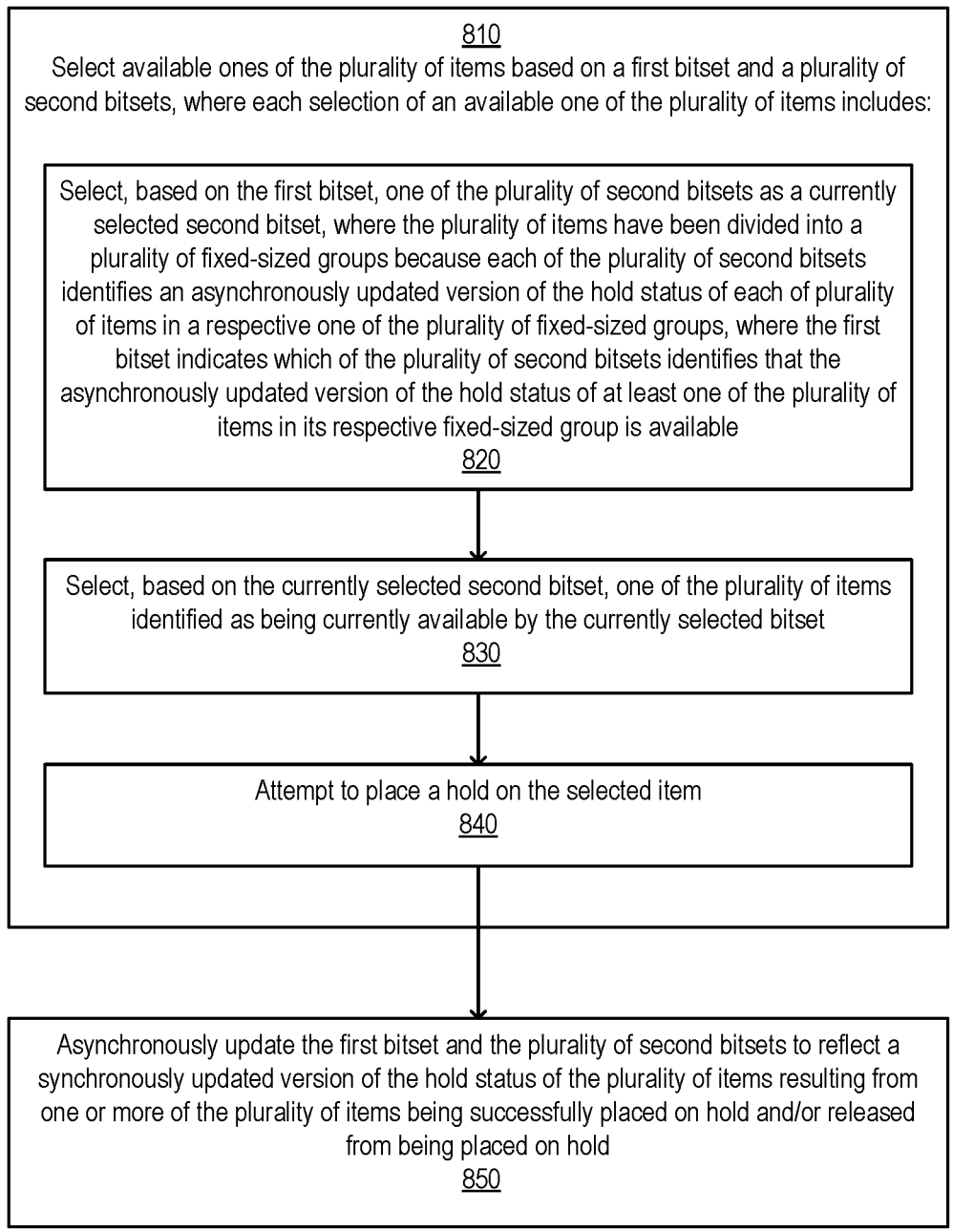
FIG. 8 is a flow diagram of a process for identifying available items of an inventory to allocate to requestors, according to some implementations.

FIG. 8 is a flow diagram of a process for identifying available items of an inventory to allocate to requestors, according to some implementations. In an implementation, the process is performed by one or more computing devices that implement an entity service. In an implementation, the inventory has a plurality of items, and each of the plurality of items has a hold status identifying the item as being currently available or already placed on hold. In an implementation, the process is initiated when a requestor (e.g., user) makes a request to place a hold on an inventory item (e.g., by the user adding a product to their online shopping cart).

At block 810, the computing device selects available ones of the plurality of items based on a first bitset (e.g., inventory bitset) and a plurality of second bitsets (e.g., group bitsets). In an implementation, the first bitset and the plurality of second bitsets are stored in a cache (e.g., cache 130). In an implementation, each selection of an available one of the plurality of items includes the operations of blocks 820-840. At block 820, the computing device selects, based on the first bitset, one of the plurality of second bitsets as a currently selected second bitset, where the plurality of items have been divided into a plurality of fixed-sized groups because each of the plurality of second bitsets identifies an asynchronously updated version of the hold status of each of plurality of items in a respective one of the plurality of fixed-sized groups, where the first bitset indicates which of the plurality of second bitsets identifies that the asynchronously updated version of the hold status of at least one of the plurality of items in its respective fixed-sized group is available. In an implementation, the selection of one of the plurality of second bitsets as a currently selected second bitset is at random. At block 830, the computing device selects, based on the currently selected bitset, one of the plurality of items identified as being currently available by the currently selected bitset. In an implementation, the selection of one of the plurality of items is at random. At block 840, the computing device attempts to place a hold on the selected item. In an implementation, the attempting includes updating a separate data structure (e.g., hold table 145) that tracks a synchronously updated version of the hold status for each of the plurality of items when the attempting is successful and causing a repeat of the selection of an available one of the plurality of items when the attempting is unsuccessful. In an implementation, the separate data structure is a database object, and the attempting includes attempting to insert a record (e.g., a hold record) in the database object, where the attempting is successful when the record is successfully inserted, and where the attempting is unsuccessful when the record is not successfully inserted because the record was already inserted responsive to a different attempt. In an implementation, the database object is a database table and the record is a row of the database table. In an implementation, the record includes a composite key that is generated based on an inventory ID that identifies the inventory and a group ID that identifies one of the plurality of fixed-sized groups. In an implementation, the attempting is unsuccessful as a result of a delay between the selection of an available one of the plurality of items and the asynchronous updating of the first bitset and the plurality of second bitsets.

At block 850, the computing device asynchronously updates the first bitset and the plurality of second bitsets to reflect a synchronously updated version of the hold status of the plurality of items resulting from one or more of the plurality of items being successfully placed on hold and/or released from being placed on hold. In an implementation, the asynchronously updating is based on processing one or more change events records that indicate changes to the hold status of one or more of the plurality of items. In an implementation, each of the one or more change event records includes a sequence number that indicates a relative order of that change event record with respect to other change event records. In an implementation, the asynchronous updating includes filtering change event records having sequence numbers that are older than a most recently processed sequence number to guard against retries. In an implementation, the asynchronous updating includes ensuring that the most recently processed sequence number has not changed before updating the first bitset and the plurality of second bitsets to ensure that there was no concurrent processing.

One or more of the components described herein and their associated functionality can be implemented in a cloud or as a cloud computing service. "Cloud computing" services provide shared resources, software, and information to computers and other devices upon request. In cloud computing environments, software can be accessible over a network (e.g., the internet) rather than installed locally on in-house computer systems. Cloud computing typically involves over-the-network provision of dynamically scalable and often virtualized resources. Technological details can be abstracted from the users, who no longer have need for expertise in, or control over, the technology infrastructure "in the cloud" that supports them.

Databases may be implemented according to a variety of different database models, such as relational, non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. By way of example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 9A:
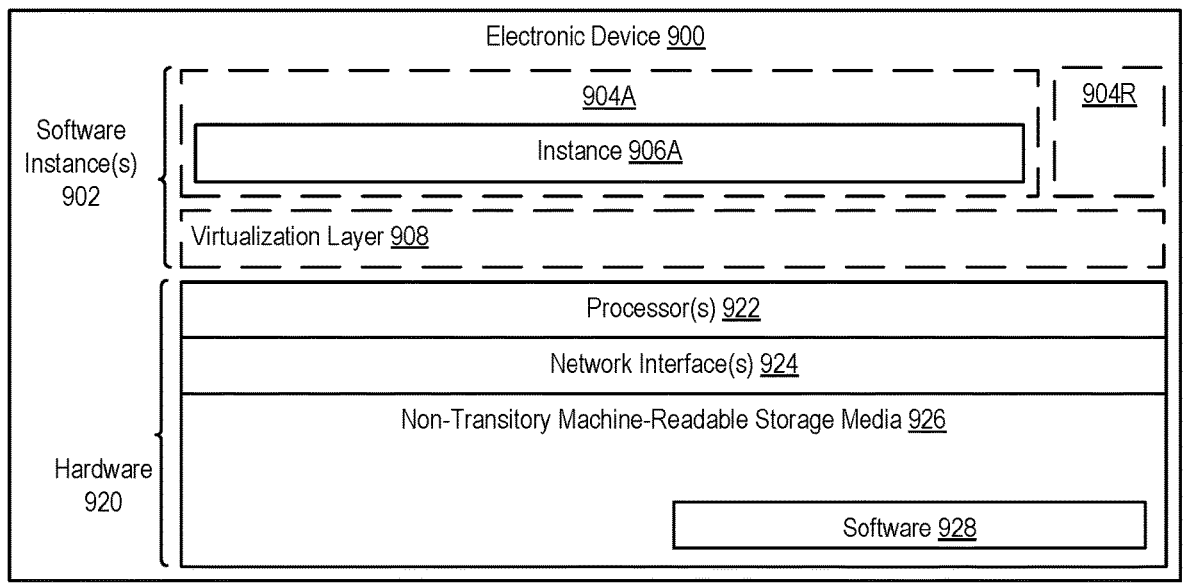
FIG. 9A is a block diagram illustrating an electronic device according to some example implementations.

FIG. 9A is a block diagram illustrating an electronic device 900 according to some example implementations.

FIG. 9A includes hardware 920 comprising a set of one or more processor(s) 922, a set of one or more network interfaces 924 (wireless and/or wired), and non-transitory machine-readable storage media 926 having stored therein software 928 (which includes instructions executable by the set of one or more processor(s) 922). Each of the previously described platform and entity service, as well as the end user clients (e.g., that access an e-commerce application implemented by the platform and/or entity service) may be implemented in one or more electronic devices 900. In one implementation: 1) each of the end user clients is implemented in a separate one of the electronic devices 900 (e.g., in user electronic devices operated by users where the software 928 represents the software to implement end user clients to interface with the platform application (e.g., a web browser, a native client, a portal, a command-line interface, and/or an application program interface (API) based upon protocols such as Simple Object Access Protocol (SOAP), Representational State Transfer (REST), etc.)); 2) the platform application (e.g., an e-commerce application) and/or the entity service is implemented in a separate set of one or more of the electronic devices 900 (e.g., a set of one or more server electronic devices where the software 928 represents the software to implement the platform and/or the entity service); and 3) in operation, the electronic devices implementing the end user clients and the platform/entity service would be communicatively coupled (e.g., by a network) and would establish between them (or through one or more other layers) connections for submitting requests (e.g., request to place a hold on an inventory item or a request to purchase an inventory item) to the platform application and returning responses (e.g., in the form of a web page) to the end user clients. Also, in operation, the electronic devices implementing the platform and the electronic devices implementing the entity service may establish between them (or through one or more other layers) connections for interacting with each other to carry out the concepts described herein. Other configurations of electronic devices may be used in other implementations (e.g., an implementation in which the end user client, the platform application, and/or the entity service are implemented on a single electronic device 900).

In electronic devices that use compute virtualization, the set of one or more processor(s) 922 typically execute software to instantiate a virtualization layer 908 and software container(s) 904A-R (e.g., with operating system-level virtualization, the virtualization layer 908 represents the kernel of an operating system (or a shim executing on a base operating system) that allows for the creation of multiple software containers 904A-R (representing separate user space instances and also called virtualization engines, virtual private servers, or jails) that may each be used to execute a set of one or more applications; with full virtualization, the virtualization layer 908 represents a hypervisor (sometimes referred to as a virtual machine monitor (VMM)) or a hypervisor executing on top of a host operating system, and the software containers 904A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 928 (illustrated as instance 906A) is executed within the software container 904A on the virtualization layer 908. In electronic devices where compute virtualization is not used, the instance 906A on top of a host operating system is executed on the "bare metal" electronic device 900. The instantiation of the instance 906A, as well as the virtualization layer 908 and software containers 904A-R if implemented, are collectively referred to as software instance(s) 902.

Alternative implementations of an electronic device may have numerous variations from that described above. For example, customized hardware and/or accelerators might also be used in an electronic device.

Figure 9B:
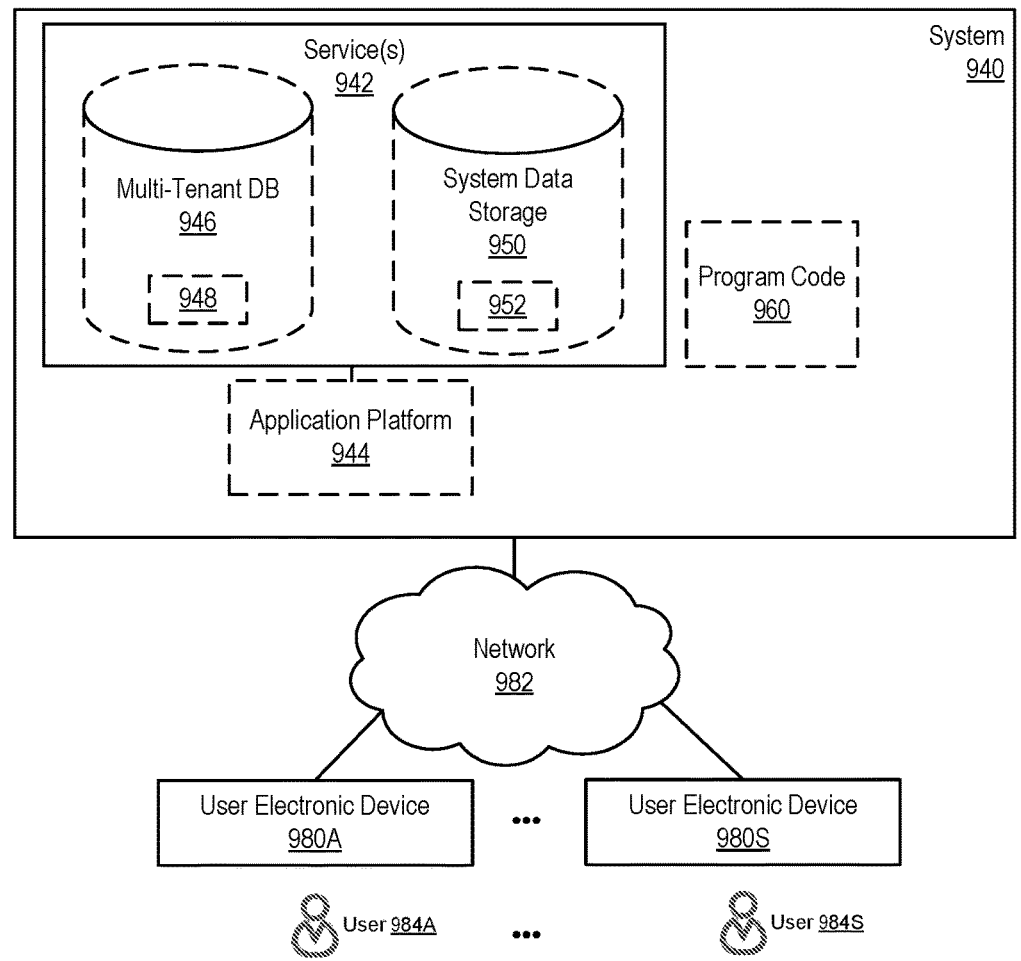
FIG. 9B is a block diagram of an environment where a platform application and an associated entity service may be deployed, according to some implementations.

FIG. 9B is a block diagram of an environment where a platform application and an associated entity service may be deployed, according to some implementations. A system 940 includes hardware (a set of one or more electronic devices) and software to provide service(s) 942, including the platform and/or the entity service (which may implement an e-commerce application). The system 940 is coupled to user electronic devices 980A-S over a network 982. The service(s) 942 may be on-demand services that are made available to one or more of the users 984A-S working for one or more other organizations (sometimes referred to as outside users) so that those organizations do not need to necessarily be concerned with building and/or maintaining a system, but instead makes use of the service(s) 942 when needed (e.g., on the demand of the users 984A-S). The service(s) 942 may communication with each other and/or with one or more of the user electronic devices 980A-S via one or more Application Programming Interface(s) (APIs) (e.g., a Representational State Transfer (REST) API). The user electronic devices 980A-S are operated by users 984A-S.

In one implementation, the system 940 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 940 may include an application platform 944 that enables PAAS for creating, managing, and executing one or more applications developed by the provider of the application platform 944, users accessing the system 940 via one or more of user electronic devices 980A-S, or third-party application developers accessing the system 940 via one or more of user electronic devices 980A-S.

In some implementations, one or more of the service(s) 942 may utilize one or more multi-tenant databases 946, as well as system data storage 950 for system data 952 accessible to system 940. In an implementation, the cache 130 and datastore 140 described herein above are implemented by multi-tenant database 946 (e.g., multi-tenant database 946 may store inventory table 141, group table 143, and/or hold table 145 for a flash sale). In certain implementations, the system 940 includes a set of one or more servers that are running on server electronic devices and that are configured to handle requests for any authorized user associated with any tenant (there is no server affinity for a user and/or tenant to a specific server). The user electronic device 980A-S communicate with the server(s) of system 940 to request and update tenant-level data and system-level data hosted by system 940, and in response the system 940 (e.g., one or more servers in system 940) automatically may generate one or more Structured Query Language (SQL) statements (e.g., one or more SQL queries) that are designed to access the desired information from the one or more multi-tenant database 946 and/or system data storage 950.

In some implementations, the service(s) 942 are implemented using virtual applications dynamically created at run time responsive to queries from the user electronic devices 980A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 960 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 944 includes an application setup mechanism that supports application developers' creation and management of applications, which may be saved as metadata by save routines. Invocations to such applications, including an e-commerce application that implements flash sales and/or entity service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 982 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 940 and the user electronic devices 980A-S.

Each user electronic device 980A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 940. For example, the user interface device can be used to access data and applications hosted by system 940, and to perform searches on stored data, and otherwise allow a user 984 to interact with various GUI pages that may be presented to a user 984. User electronic devices 980A-S might communicate with system 940 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 980A-S might include an HTTP client, commonly referred to as a "browser," for sending and receiving HTTP messages to and from server(s) of system 940, thus allowing users 984 of the user electronic device 980A-S to access, process and view information, pages and applications available to it from system 940 over network 982.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

The invention claimed is:

1. A method by a computing device for identifying available ones of a plurality of items of an inventory, where each of the plurality of items has a hold status identifying the item as being currently available or already on hold, the method comprising:
   selecting available ones of the plurality of items based on a first bitset and a plurality of second bitsets, wherein each selection of an available one of the plurality of items includes:
      selecting, based on the first bitset, one of the plurality of second bitsets as a currently selected second bitset, where the plurality of items have been divided into a plurality of fixed-sized groups because each of the plurality of second bitsets identifies an asynchronously updated version of the hold status of each of the plurality of items in a respective one of the plurality of fixed-sized groups, where the first bitset indicates which of the plurality of second bitsets identifies that the asynchronously updated version of the hold status of at least one of the plurality of items in its respective fixed-sized group is available,
      selecting, based on the currently selected second bitset, one of the plurality of items identified as being currently available by the currently selected second bitset, and
      attempting to place a hold on the selected item; and
   asynchronously updating the first bitset and the plurality of second bitsets to reflect a synchronously updated version of the hold status of the plurality of items resulting from one or more of the plurality of items being successfully placed on hold and/or released from being placed on hold.

2. The method of claim 1, wherein the attempting includes:
   updating a separate data structure that tracks a synchronously updated version of the hold status for each of the plurality of items when the attempting is successful; and
   causing a repeat of the selection of an available one of the plurality of items when the attempting is unsuccessful.

3. The method of claim 2, wherein the separate data structure is a database object, and wherein the attempting includes:
   attempting to insert a record in the database object, where the attempting is successful when the record is successfully inserted, and where the attempting is unsuccessful when the record is not successfully inserted because the record was already inserted responsive to a different attempt.

4. The method of claim 3, wherein the database object is a database table and the record is a row of the database table.

5. The method of claim 3, wherein the record includes a composite key that is generated based on an inventory ID that identifies the inventory and a group ID that identifies one of the plurality of fixed-sized groups.

6. The method of claim 1, wherein the attempting is unsuccessful as a result of a delay between the selection of an available one of the plurality of items and the asynchronous updating of the first bitset and the plurality of second bitsets.

7. The method of claim 1, wherein the first bitset and the plurality of second bitsets are stored in a cache.

8. The method of claim 1, wherein the selecting one of the plurality of second bitsets as the currently selected bitset is at random and the selecting one of the plurality of items is at random.

9. The method of claim 1, wherein the asynchronously updating is based on processing one or more change events records that indicate changes to the hold status of one or more of the plurality of items.

10. The method of claim 9, wherein each of the one or more change event records includes a sequence number that indicates a relative order of that change event record with respect to other change event records.

11. The method of claim 10, wherein the asynchronous updating includes filtering change event records having sequence numbers that are older than a most recently processed sequence number to guard against retries.

12. The method of claim 11, wherein the asynchronous updating includes ensuring that the most recently processed sequence number has not changed before updating the first bitset and the plurality of second bitsets to ensure that there was no concurrent processing.

13. A computing device configured to identify available ones of a plurality of items of an inventory, where each of the plurality of items has a hold status identifying the item as being currently available or already on hold, the computing device comprising:
one or more processors; and
a non-transitory machine-readable storage medium having instructions stored therein, which when executed by the one or more processors, causes the computing device to:
select available ones of the plurality of items based on a first bitset and a plurality of second bitsets, wherein each selection of an available one of the plurality of items includes:
selecting, based on the first bitset, one of the plurality of second bitsets as a currently selected second bitset, where the plurality of items have been divided into a plurality of fixed-sized groups because each of the plurality of second bitsets identifies an asynchronously updated version of the hold status of each of the plurality of items in a respective one of the plurality of fixed-sized groups, where the first bitset indicates which of the plurality of second bitsets identifies that the asynchronously updated version of the hold status of at least one of the plurality of items in its respective fixed-sized group is available,
selecting, based on the currently selected second bitset, one of the plurality of items identified as being currently available by the currently selected second bitset, and
attempting to place a hold on the selected item, and
asynchronously updating the first bitset and the plurality of second bitsets to reflect a synchronously updated version of the hold status of the plurality of items resulting from one or more of the plurality of items being successfully placed on hold and/or released from being placed on hold.

14. The computing device of claim 13, wherein the attempting includes:
updating a separate data structure that tracks a synchronously updated version of the hold status for each of the plurality of items when the attempting is successful; and
causing a repeat of the selection of an available one of the plurality of items when the attempting is unsuccessful.

15. The computing device of claim 14, wherein the separate data structure is a database object, and wherein the attempting includes:
attempting to insert a record in the database object, where the attempting is successful when the record is successfully inserted, and where the attempting is unsuccessful when the record is not successfully inserted because the record was already inserted responsive to a different attempt.

16. The computing device of claim 15, wherein the database object is a database table and the record is a row of the database table.

17. A non-transitory machine-readable storage medium having instructions stored therein which are configured to cause a computing device that executes the instructions to perform operations for identifying available ones of a plurality of items of an inventory, where each of the plurality of items has a hold status identifying the item as being currently available or already on hold, the operations comprising:
selecting available ones of the plurality of items based on a first bitset and a plurality of second bitsets, wherein each selection of an available one of the plurality of items includes:
selecting, based on the first bitset, one of the plurality of second bitsets as a currently selected second bitset, where the plurality of items have been divided into a plurality of fixed-sized groups because each of the plurality of second bitsets identifies an asynchronously updated version of the hold status of each of the plurality of items in a respective one of the plurality of fixed-sized groups, where the first bitset indicates which of the plurality of second bitsets identifies that the asynchronously updated version of the hold status of at least one of the plurality of items in its respective fixed-sized group is available,
selecting, based on the currently selected second bitset, one of the plurality of items identified as being currently available by the currently selected second bitset, and
attempting to place a hold on the selected item; and
asynchronously updating the first bitset and the plurality of second bitsets to reflect a synchronously updated version of the hold status of the plurality of items resulting from one or more of the plurality of items being successfully placed on hold and/or released from being placed on hold.

18. The non-transitory machine-readable storage medium of claim 17, wherein the attempting is unsuccessful as a result of a delay between the selection of an available one of the plurality of items and the asynchronous updating of the first bitset and the plurality of second bitsets.

19. The non-transitory machine-readable storage medium of claim 17, wherein the asynchronously updating is based on processing one or more change events records that indicate changes to the hold status of one or more of the plurality of items.

20. The non-transitory machine-readable storage medium of claim 19, wherein each of the one or more change event records includes a sequence number that indicates a relative order of that change event record with respect to other change event records, wherein the asynchronous updating includes filtering change event records having sequence numbers that are older than a most recently processed sequence number to guard against retries.

* * * * *